United States Patent
Lu et al.

(10) Patent No.: US 8,549,316 B2
(45) Date of Patent: Oct. 1, 2013

(54) METHOD AND APPARATUS FOR PASSWORD OUTPUT

(75) Inventors: Chia-Ching Lu, Hsinchu (TW);
Chao-Huang Pai, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 1508 days.

(21) Appl. No.: 11/758,981

(22) Filed: Jun. 6, 2007

(65) Prior Publication Data
US 2008/0307236 A1 Dec. 11, 2008

(51) Int. Cl.
*G06F 21/00* (2013.01)

(52) U.S. Cl.
USPC ............... 713/184; 713/2; 713/170; 398/106

(58) Field of Classification Search
USPC ............... 713/2, 170, 184; 398/106
See application file for complete search history.

(56) References Cited

U.S. PATENT DOCUMENTS

| | | | | |
|---|---|---|---|---|
| 6,088,143 | A * | 7/2000 | Bang | 398/106 |
| 2004/0193868 | A1 * | 9/2004 | Kuo | 713/2 |
| 2007/0028105 | A1 * | 2/2007 | Hynek | 713/170 |

FOREIGN PATENT DOCUMENTS

| | | |
|---|---|---|
| CN | 2733473 | 10/2005 |
| JP | 2004-295632 | 10/2004 |
| JP | 2005-266951 | 9/2005 |
| JP | 2005-317049 | 11/2005 |
| JP | 2006-155513 | 6/2006 |
| WO | WO03062968 A1 * | 7/2003 |

OTHER PUBLICATIONS

Japanese Examination Report of Japan Application No. 2007-123577, dated Jun. 16, 2010.
"Third Office Action of China Counterpart Application", issued on Nov. 16, 2011, p. 1-p. 4, in which the listed reference was cited.

* cited by examiner

*Primary Examiner* — Jeffrey Pwu
*Assistant Examiner* — Thong Truong
(74) *Attorney, Agent, or Firm* — J.C. Patents

(57) ABSTRACT

A method and an apparatus for account and/or password output are disclosed. In the present invention, a hot-key corresponding to an account and/or a password is set in advance. By entering the hot-key, the related account and/or password is transferred and login automatically, thus the purpose of making login more conveniently is achieved. Besides, the present invention combines various input device to make the way of setting hot-key become more diversely, therefore security of password login is also enhanced.

20 Claims, 4 Drawing Sheets

METHOD AND APPARATUS FOR PASSWORD OUTPUT

BACKGROUND OF THE INVENTION

1. Field of the Invention

The present invention generally relates to a method and an apparatus for outputting an account and/or a password by setting a hotkey, and more particularly, to a method and an apparatus for outputting an account and/or a password which combine various input interfaces to enhance flexibility of setting a hotkey.

2. Description of Related Art

With the advancement of information era, the popularity of computer products is increased year by year. Nowadays, people are not only able to use computers to deal with documents and store data, but also capable of getting information from the internet via computers or communicating with others via the internet. Definitely, the applications of computers have greatly increased the convenience of our daily lives. As a result, the computer products are the indispensable tools of our daily live activities.

In consideration of personal privacy protection and information security, in environments that are relatively open, such as in offices or in dormitories, it is quite possible for a user to set accounts and passwords therefor for computer systems, specific programs, finance websites relating to private information or important confidential documents, to prevent others from discretionary using his/her computer, thereby avoiding information from being peeked or stolen.

While the object of personal privacy protection and information security is achieved by setting an account and a password, a user has to keep in his/her mind various accounts and corresponding passwords. A user can not start a computer, read and/or write a document or run a specific program until he/she inputs complicated accounts and passwords via fussy steps to get a permission to perform subsequent operations. If the user has permission to set an account and a password by himself/herself, he/she can certainly set the account and the password that are familiar to himself/herself and used frequently so as to avoid forgetting the account and the password. However, in case the user has to login an internal business system of a company or open a confidential document provided by a client, where the account and the password are usually not set by the user and are complicated and lengthy, in such case, rate that the user forgets the account and/or the password and thus he/she cannot get permission, is greatly increased.

In addition, when a user enters an account and a password using hands, he/she has to take a risk that someone is peeking to learn the password or that someone steals the password via remote login to the computer. These are unavoidable shortcoming of information security and usually result in inconveniences to the user.

SUMMARY OF THE INVENTION

Accordingly, the present invention is directed to a method for outputting an account and/or a password which makes login more convenient and quick by setting a hotkey.

The present invention is also directed to an apparatus for outputting an account and/or a password which avoids the password from being peeked by someone when a user is inputting the account and the password, or from being filched via remote login, by transforming automatically a hotkey set in advance into the account and/or the password needed for login process.

According to an embodiment of the present invention, a method for outputting an account and/or a password for an electronic device is provided. First, an account and/or password correspondence table registering correspondence relationship between an input interface type as well as an input signal value and an account and/or password datum is provided. Next, an input event is received, and the input interface type and the input signal value corresponding to the input event is identified as an input condition. If the input condition exists in the account and/or password correspondence table, the corresponding account and/or password datum is transmitted to the electronic device to successfully login.

According to a preferred embodiment of the present invention of the method, after identifying the input interface type and the input signal value corresponding to the input event as the input condition, the method further comprises if the input condition exists in the account and/or password correspondence table, decrypting the account and/or password correspondence table.

According to a preferred embodiment of the present invention of the method, after identifying the input interface type and the input signal value corresponding to the input event as the input condition, the method further comprises if the input condition does not exist in the account and/or password correspondence table, the input signal value is transmitted to the electronic device.

According to a preferred embodiment of the present invention of the method, wherein the step of providing the account and/or password correspondence table comprises the following steps. A second input event is received, and a second input signal value corresponding to the second input event is identified. Next, whether or not the electronic device is in a hotkey setting mode is determined, wherein if the electronic device is in the hotkey setting mode, the input interface type and the input signal value corresponding to a hotkey input event after receiving the hotkey input event are identified. Finally, the second input signal value is regarded as the account and/or password datum, and the correspondence relationship between the input interface type as well as the input signal value and the account and/or password datum are registered in the account and/or password correspondence table.

According to a preferred embodiment of the present invention of the method, the method further comprises encrypting the account and/or password correspondence table after registering the correspondence relationship between the input interface type and the input signal value and the account and/or password datum in the account and/or password correspondence table.

According to a preferred embodiment of the present invention of the method, if the electronic device is not in the hotkey setting mode, the second input signal value is transmitted to the electronic device.

According to a preferred embodiment of the present invention of the method, the input interface type comprises a Universal Serial Bus interface, a PS/2 interface, a serial port, a parallel port, an infrared interface, a Bluetooth interface or a combination thereof.

According to a preferred embodiment of the present invention of the method, the account and/or password correspondence table is stored in a non-volatile memory built in the electronic device or stored in an external storage device.

According to another aspect of the present invention, an apparatus for outputting an account and/or a password is provided. The apparatus comprises a memory unit, at least one input interface, an identification module and a processing module. Wherein, the memory unit is provided for storing an account and/or password correspondence table registering correspondence relationship between an input interface type as well as an input signal value and an account and/or password datum. The input interface is provided for inputting an input event. The identification module is provided for identifying the input interface type and the input signal value corresponding to the input event, and regarding the input interface type and the input signal value as an input condition. The processing unit is provided for transmitting the corresponding account and/or password datum to an electronic device to login, after determining that the input condition is existed in the account and/or password correspondence table.

According to a preferred embodiment of the present invention of the apparatus, the apparatus further comprises a decrypting module for decrypting the account and/or password correspondence table stored in the memory unit.

According to a preferred embodiment of the present invention of the apparatus, if the processing module determines that the input condition does not exist in the account and/or password correspondence table, the processing module transmits the input signal value to the electronic device.

According to a preferred embodiment of the present invention of the apparatus, the input interface is further used for inputting a second input event, and the second input event is identified by the identification module as a second input signal value. After the processing module determines that the electronic device is in a hotkey-setting mode, the apparatus receives a hotkey input event via the input interface, the identification module identifies the input interface type and the input signal value corresponding to the hotkey input event, and the processing module regards the second input signal value as the account and/or password datum and registers the correspondence relationship between the input interface type, the input signal value and the account and/or password datum in the account and/or password correspondence table.

According to a preferred embodiment of the present invention of the apparatus, if the processing unit determines that the electronic device is not in the hotkey setting mode, the processing unit transmits the second input signal value to the electronic device.

According to a preferred embodiment of the present invention of the apparatus, the apparatus further comprises an encrypting module for encrypting the account and/or password correspondence table stored in the memory unit.

According to a preferred embodiment of the present invention of the apparatus, the memory unit comprises one of a non-volatile memory built in the apparatus and an external storage device.

In a preferred embodiment of the present invention of the apparatus, the input interface comprises a Universal Serial Bus interface, a PS/2 interface, a serial port, a parallel port, an infrared interface or a Bluetooth interface.

In the present invention, a hotkey corresponding to an account and/or a password can be set. By entering the hot-key, the related account and/or password is automatically transferred and login, thus the purpose of making login more conveniently is achieved. Besides, the present invention combines various input device to make the way of setting hot-key become more diverse and comprehensive, therefore the security of login is also enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
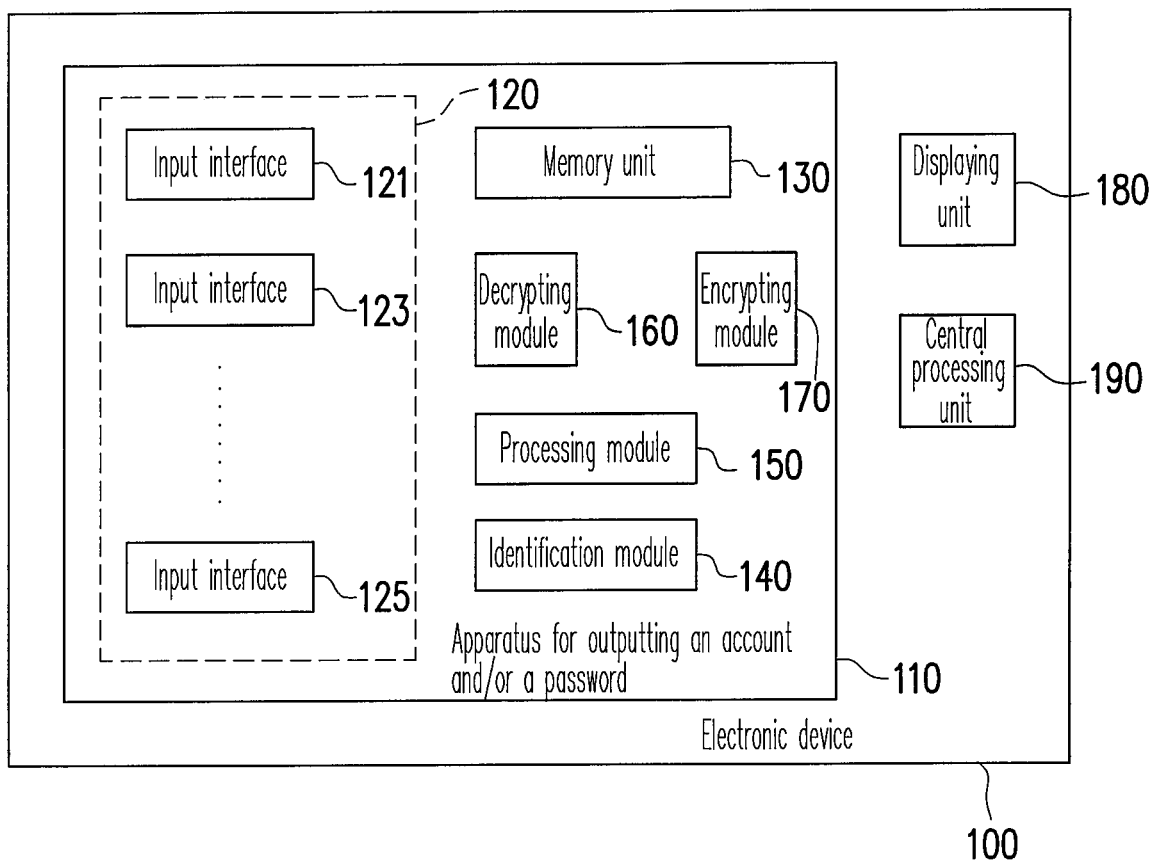
FIG. 1 is a block diagram of an apparatus for outputting an account and/or a password according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of apparatus for outputting an account and/or a password according to a preferred embodiment of the present invention. In this embodiment, an apparatus 110 for outputting an account and/or a password may be, for example, an input/output controlling chip built in an electronic device 100, and the electronic device 100 may be, for example, a personal computer or a laptop. However, the present invention is not limited to the specific examples. With assistant of the apparatus 110 for outputting an account and/or a password, a user is thus able to login the electronic device 100 in a quicker and safer way.

Referring to FIG. 1, the apparatus 110 for outputting an account and/or a password includes at least one input interface 120, a memory unit 130, an identification module 140, a processing module 150, a decrypting module 160 and an encrypting module 170. The input interface 120 is an interface where a user can enter an input event into the apparatus 110. In this embodiment, the input interface 120 may include, for example, a Universal Serial Bus (USB) interface, a PS/2 interface, a serial port, a parallel port, an infrared interface or a Bluetooth interface. Meanwhile, the input interface 120 can be connected to a peripheral device such as a keyboard, a mouse, a floppy, or an infrared ray transmission remote controller, or even connected to another personal computer or laptop, etc. The present invention is not limited thereto.

The memory unit 130 is used for storing an account and/or password correspondence table in which correspondence relationship between an input interface type, an input signal value and an account and/or a password datum is stored. In this embodiment, the memory unit 130 may be embodied as a non-volatile memory built in the apparatus 110.

The identification module 140 is mainly used for identifying an input interface type and an input signal value corresponding to an input event input via the input interface 120, and regarding the input interface type and the input signal value as an input condition. For instance, if the input event is obtained by that the user inputs a serial of English characters "gmail" by utilizing a keyboard and through a USB interface (e.g. the input interface 121), and double clicks the left button of a mouse connected to a PS/2 interface (e.g. the input interface 123), the identification module 140 will identify that the input interface type is a keyboard and a mouse, and the input signal value is corresponding to characters g, m, a, i, l and the operation of double left click of the mouse.

The processing module 130 is used for comparing the input condition (i.e. the input interface type and the input signal value) with data registered in the account and/or password correspondence table. If the input condition exists in the account-password correspondence table, the processing module 150 will transmit the corresponding account and/or password datum to a central processing unit 190 of the electronic device 100 to login.

In addition, the apparatus 110 for outputting an account and/or a password further includes a capability of encrypting or decrypting the account and/or password correspondence table stored in the memory unit 130. Wherein, the encrypting module 170 is used for encrypting the account and/or password correspondence table before the account and/or password correspondence table is stored. Comparatively, the decrypting module 160 is used for decrypting the encrypted account and/or password correspondence table.

Figure 2:
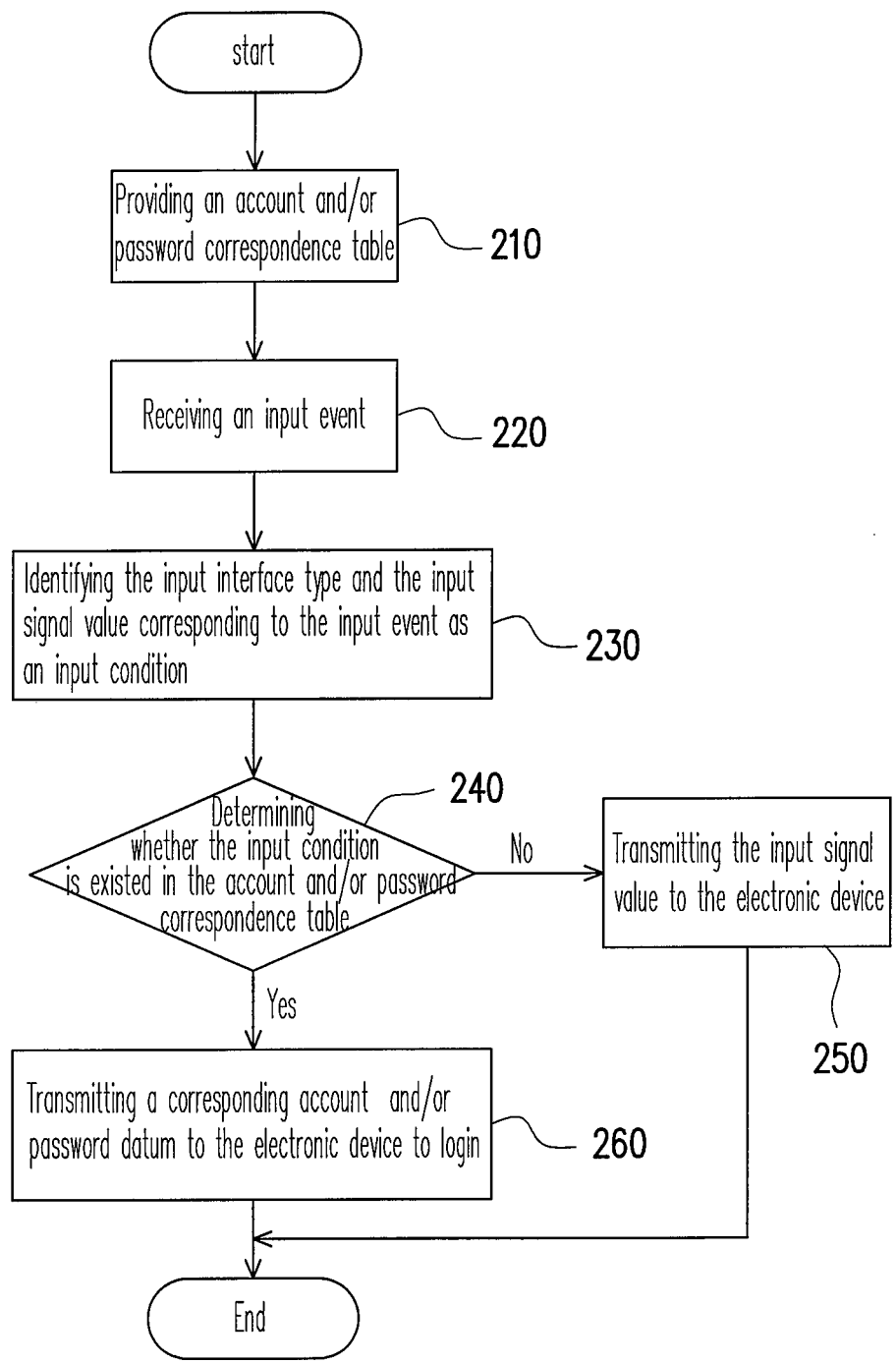
FIG. 2 is a flowchart of a method for outputting an account and/or a password according to an embodiment of the present invention.

Another embodiment of the present invention will be illuminated for describing in more detail an operation flow of an apparatus for outputting an account and/or a password according to the present invention. FIG. 2 is a flowchart of a method of outputting an account and/or a password according to a preferred embodiment of the present invention. Referring to FIG. 1 and FIG. 2, in this embodiment, steps for logging in the electronic device 100 via the apparatus 110 for outputting an account and/or a password are illuminated in detail.

Figure 3:
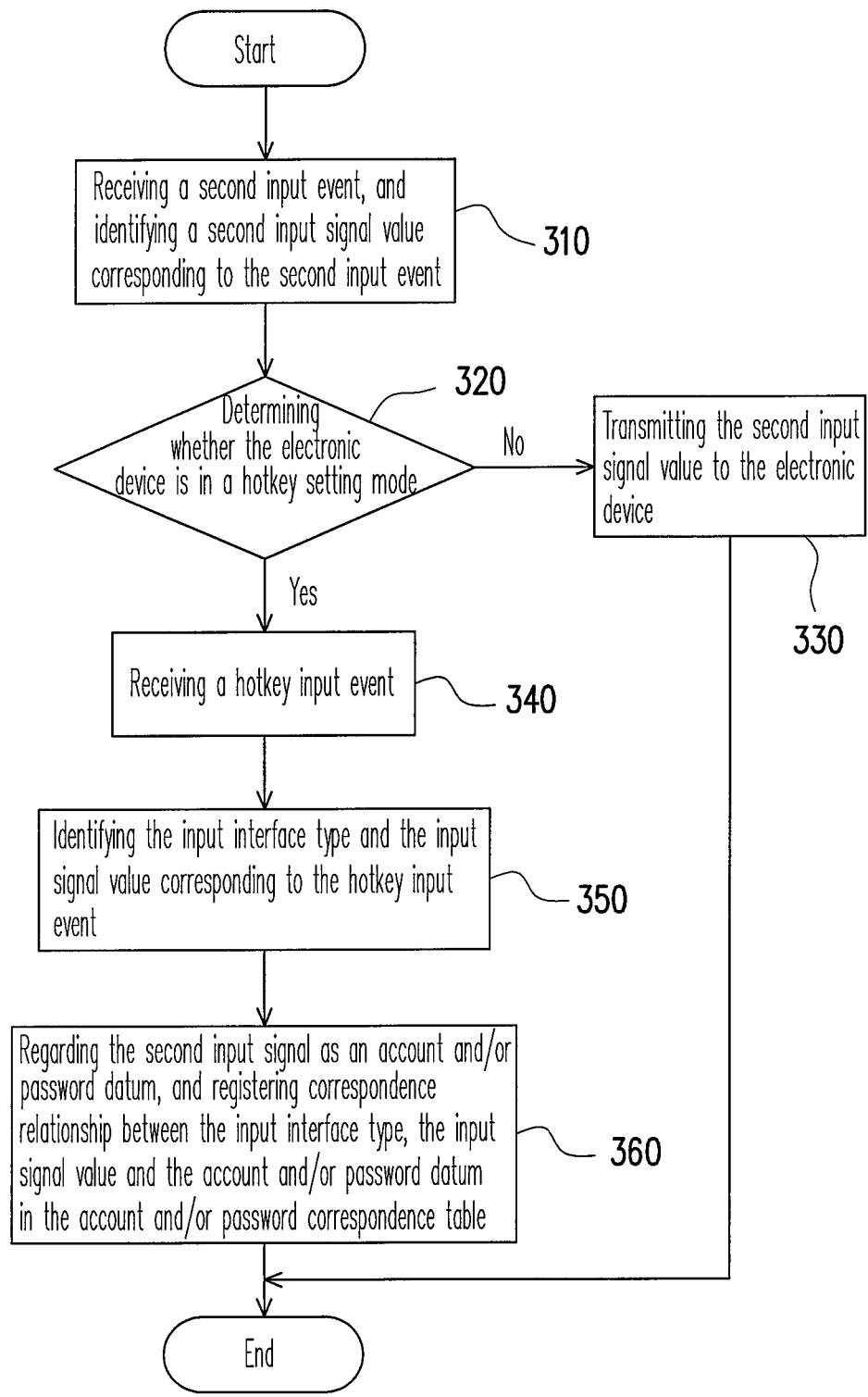
FIG. 3 is a flowchart of method for providing an account and/or password correspondence table according to an embodiment of the present invention.

After power supply of the electronic device 100 is turned on and initialization of the apparatus 110 for outputting an account and/or a password is completed, but before login via the apparatus 110, an account/password correspondence table in which correspondence relationship between an input interface type, an input signal value and an accounts and/or password datum is registered, must be provided (step 210). FIG. 3 is a flowchart of a method for providing an account and/or password correspondence table according to a preferred embodiment of the present invention. Referring to FIG. 3, a second input event is input by a user via the input interface 120, and identified by the identification module 140 as a second input signal value (step 310).

Next, as shown in step 320, the processing module 150 determines whether or not the electronic device 100 is currently in a hotkey setting mode. In an embodiment, a user can change status of the electronic device 100 from a general mode into a hotkey setting mode by, for example, running a hotkey setting program. If the electronic device 100 is currently not in the hotkey-setting mode, the processing module 150 will then regard the second input event as a general input event, and transmit the second input event directly to the central processing unit 190 to perform a general process, as illustrated in step 330.

If the electronic device 100 is currently in the hotkey setting mode (i.e. the second input event input by the user as described above is a login account or a password needed to be stored), a displaying unit 180 of the electronic device 100 displays a hotkey inputting window to remind the user of inputting a hotkey corresponding to the second input event, as illustrated in step 340. And then, the apparatus 110 for outputting an account and/or a password receives a hotkey input event corresponding to the operation of the user via the input interface 120.

In this embodiment, a user may send out a hotkey input event, such as clicking a mouse, moving a mouse, pressing a character key, pressing a function key or a pressing a number key, through a single interface (e.g. the input interface 121). Besides, the user may send out a hotkey input event by utilizing more than one interface (e.g. using the input interface 121 and 123 at the same time). For instance, the user may get a hotkey input event by pressing a character key of a keyboard and at the same time double clicks the left button of a mouse, or by connecting a serial port to a specific voltage and supplementing a keyboard input. Each embodied as the input interface 120 or a combination thereof can be the interface for providing a hotkey input event. The present invention is not limited thereto.

As shown in step 350, the identification module 140 identifies the input interface type and the input signal value corresponding to the hotkey input event. Finally, in step 360, the processing module 150 regards the second input signal value as an account and/or password datum, and registers the correspondence relationship between the input interface type as well as the input signal value and the account and/or the password datum in the account and/or password correspondence table in the memory unit 130.

In an embodiment, a step is further provided to encrypt the account and/or password correspondence table by using an encrypting module 170 before storing the account and/or password correspondence table. A point that is deserved to be emphasized is that, the decrypting module 160 is not able to decrypt the encrypted account and/or password correspondence table unless the decrypting module 160 and the encrypting module 170 exist in the same apparatus 110 for outputting an account and/or a password. It is to say, if the memory unit 130 in this embodiment is connected externally to an external memory device (e.g. a memory card) of the apparatus 110, there is a possibility that the memory unit 130 is removed to be installed into other devices, and only the apparatus 110 is able to correctly read/write the content in the account and/or password correspondence table, thereby preventing others from stealing correspondence information between the account and/or the password and the hotkey.

Through steps as shown in FIG. 3, a user can set a hotkey for an important account and/or password by using combination of various input interfaces according to use habits of him/her, and the correspondence relationship thereof will be stored in the account and/or password correspondence table.

In the embodiments described above, the memory unit 130 may comprise a non-volatile memory built in the apparatus 110 for outputting an account and/or a password or an external storage device (e.g. a memory card, a disc or a floppy) etc. The present invention is not limited thereto. For a purpose of illustration, it is assumed that the memory unit 130 is a non-volatile memory built in the apparatus 110 for outputting an account/a password in embodiments set forth below.

When a user finds a query window displayed in a display unit 190 and starts login operation (e.g. log in an e-mail box or an instant messaging software), the apparatus 110 for outputting an account and/or a password will receive an input event sent out by the user (step 220). The identification module 140 identifies the input interface type and the input signal value corresponding to the input event, and takes the input interface type and the input signal value as an input condition (step 230).

As an example, when a user double clicks the left button of a mouse, the identification module 140 must identify that the input interface type is a mouse and the input signal value is double left click, and take the results as an input condition. When the user sends out an input event by pressing the key for character "a" via a keyboard and double left click of a mouse, the identification module 140 will identify that the input interface type is a keyboard and a mouse, and the corresponding input signal value is the character "a" and double left click of a mouse.

Next, as shown in step 240, the processing module 150 determines whether or not the input condition exists in the account and/or password correspondence table. If the input condition does not exist in the account and/or password correspondence table, the processing module 150 will transmit the input signal value directly to a central processing unit 190 of the electronic device 100 to perform a subsequent process with the general input.

However, if the input condition exists in the account and/or password correspondence table, i.e. the input event sent out currently by the user is the account and/or password input event set in advance, then, based on the data registered in the account and/or password correspondence table, the processing module 150 transmits the account and/or the password datum corresponding to the input condition to the central processing unit 190 built in the electronic device 100 to login automatically, as shown in step 260.

In another embodiment, if the processing unit 150 finds that the account and/or password correspondence table has been encrypted when comparing the input condition with the account and/or password correspondence table, then the processing module 150 is not able to access to the data in the account and/or password correspondence table until the decrypting module 160 decrypts the account and/or password correspondence table.

Figure 4:
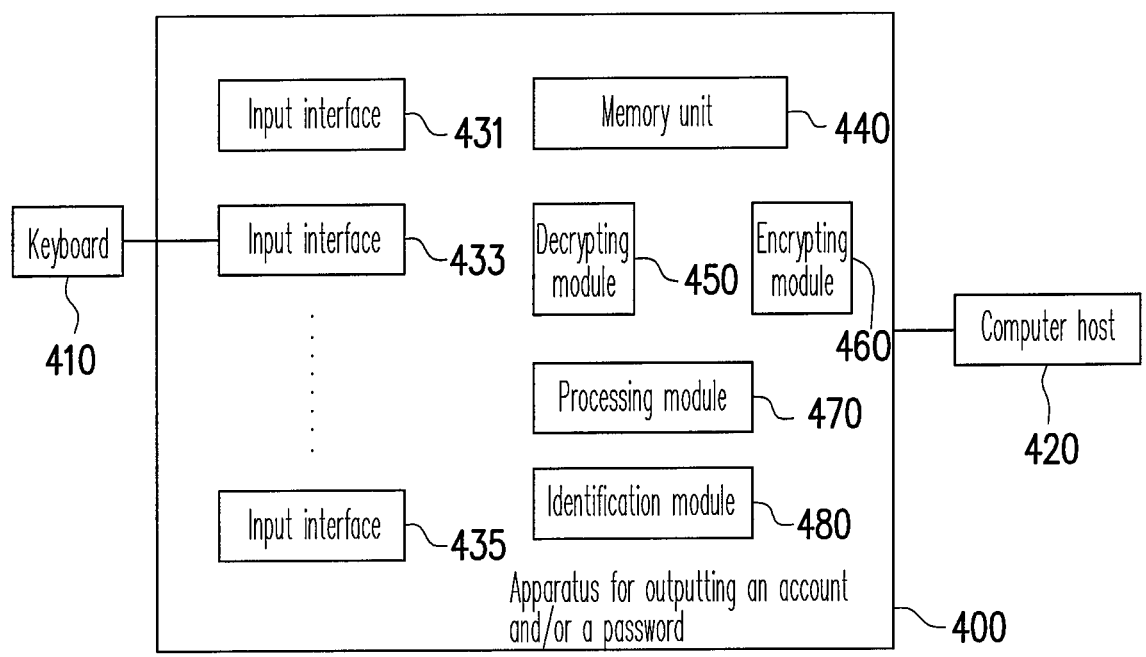
FIG. 4 is a block diagram of an apparatus for outputting an account and/or a password according to another embodiment of the present invention.

In still another embodiment, when a MIS staff of a company needs to update systems for some computers used by staffs, he/she has to login a special administrator account to update the systems. However, it is a waste of time if he/she has to enter the administrator account and the password every time when the updates a computer. In addition, in an office, such an open environment, there is a risk that someone might peek the account and the password or record the account and the password by a program when the MIS staff enters the administrator account and the password, which leads to dropouts in administration aspects. FIG. 4 is a block diagram of an apparatus for outputting an account and/or a password according to another preferred embodiment of the present invention. Referring to FIG. 4, how to use the apparatus 400 for outputting an account and/or a password to solve the problems that might occur as described above, is set forth in this embodiment.

In this embodiment, an account and/or password correspondence table that is stored in a memory unit 440 (such as a non-volatile memory) built in the apparatus 400 for outputting an account and/or a password has registered therein in advance with correspondence relationship between an administrator account as well as a password therefor and a hotkey. When the MIS staff needs to update the system in a computer host 420, he/she first connects the apparatus 400 to a peripheral device that is a keyboard 410 of the computer host 420 through an input interface 433, and at the same time connects the apparatus 400 to the computer host 420 in series. And then, a hotkey can be input via the keyboard 410, and the administration account and the password corresponding to the hotkey are transmitted to the computer host 420 via the apparatus 400 to log quickly in the administrator account. A point deserved to be noted is that even if someone records the hotkey, he/she is not able to login the administrator account by using the hotkey without assistance of the apparatus 400, because the correspondence relationship between the hotkey and the administrator account is registered in the memory unit 440 built in the apparatus 400. Therefore, with the apparatus 400 in which the correspondence relationship between the administrator account and/or the password and the hotkey is registered in advance, it can prevent the administrator account and the password therefor from being peeped when inputting the account and the password, thereby preventing discretional login the administrator account.

As described above, the method and the apparatus for outputting an account and/or a password according to the present invention have at least following advantages.

1. Login is more convenient and quick by setting a hotkey for an account and/or a password.

2. With capability of encryption/decryption with hardware, only a particular apparatus for outputting an account and/or a password is able to read the content in the account and/or password correspondence table, therefore, not only security but also confidentiality of login is greatly enhanced.

3. Use habits of a user are supported and the user is able to set a hotkey by combining various input interfaces, thereby flexibility of setting a hotkey being enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for outputting a password for an electronic device, comprising:
    providing a password correspondence table registering correspondence relationship between an input interface type as well as an input signal value and a password datum;
    receiving an input event;
    simultaneously identifying the input interface type and the input signal value corresponding to the input event as an input condition; and
    transmitting the corresponding password datum to the electronic device to login when a correspondence relationship between the input interface type and the input signal value of the input condition exists in the password correspondence table.

2. The method of claim 1, wherein after identifying the input interface type and the input signal value corresponding to the input event as the input condition, further comprising:
    decrypting the password correspondence table.

3. The method of claim 1, wherein after identifying the input interface type and the input signal value corresponding to the input event as the input condition, further comprising:
    transmitting the input signal value to the electronic device when the input condition does not exist in the password correspondence table.

4. The method of claim 1, wherein the step of providing the password correspondence table comprises:
    receiving a second input event, and identifying a corresponding second input signal value;
    determining whether or not the electronic device is in a hotkey setting mode;
    receiving a hotkey input event when the electronic device is in the hotkey setting mode;
    identifying the input interface type and the input signal value corresponding to the hotkey input event; and
    regarding the second input signal value as the password datum, and registering the correspondence relationship between the input interface type as well as the input signal value and the password datum in the password correspondence table.

5. The method of claim 4, wherein after registering the correspondence relationship between the input interface type and the input signal value and the password datum in the password correspondence table, the method further comprises:
    encrypting the password correspondence table.

6. The method of claim 4, wherein after determining whether or not the electronic device is in the hotkey setting mode, the method further comprises:

transmitting the second input signal value to the electronic device if the electronic device is not in the hotkey setting mode.

7. The method of claim 1, wherein the input interface type comprises a Universal Serial Bus interface, a PS/2 interface, a serial port, a parallel port, an infrared interface, a Bluetooth interface or a combination thereof.

8. The method of claim 1, wherein the password correspondence table is stored in a non-volatile memory built in the electronic device or stored in an external storage device.

9. The method of claim 1, wherein the input event is received from a plurality of types of input interfaces, the input interface type comprises the types of the input interfaces and the input signal value comprises a plurality of signal values inputted through the types of the input interfaces simultaneously.

10. The method of claim 1, wherein the input signal value corresponding to the input event comprises a specific voltage connected to the input interface type corresponding to the input event.

11. An apparatus for outputting a password, comprising:
    a memory unit, for storing a password correspondence table registering correspondence relationship between an input interface type as well as an input signal value and a password datum;
    at least one input interface, for inputting an input event;
    an identification module, for simultaneously identifying the input interface type and the input signal value corresponding to the input event as an input condition; and
    a processing unit, for transmitting the corresponding password datum to an electronic device to login when a correspondence relationship between the input interface type and the input signal value of the input condition exists in the password correspondence table.

12. The apparatus of claim 11, further comprising:
    a decrypting module, for decrypting the password correspondence table stored in the memory unit.

13. The apparatus of claim 11, wherein when the processing module determines that the input condition does not exist in the password correspondence table, the processing module transmits the input signal value to the electronic device.

14. The apparatus of claim 13, wherein the input interface comprises a Universal Serial Bus interface, a PS/2 interface, a serial port, a parallel port, an infrared interface or a Bluetooth interface.

15. The apparatus of claim 11, wherein the input interface is further used for inputting a second input event, and the second input event is identified by the identification module as a second input signal value, and wherein after the processing module determines that the electronic device is in a hotkey-setting mode, the apparatus receives a hotkey input event via the input interface, the identification module identifies the input interface type and the input signal value corresponding to the hotkey input event, and the processing module regards the second input signal value as the password datum and registers the correspondence relationship between the input interface type, the input signal value and the password datum in the password correspondence table.

16. The apparatus of claim 15, wherein when the processing unit determines that the electronic device is not in the hotkey setting mode, the processing unit transmits the second input signal value to the electronic device.

17. The apparatus of claim 11, further comprising:
    an encrypting module, for encrypting the password correspondence table stored in the memory unit.

18. The apparatus of claim 11, wherein the memory unit comprises one of a non-volatile memory built in the apparatus and an external storage device.

19. The apparatus of claim 11, wherein the apparatus comprises a plurality of types of input interfaces for inputting the input event, the input interface type comprises the types of the input interfaces and the input signal value comprises a plurality of signal values inputted through the types of the input interfaces simultaneously.

20. The apparatus of claim 11, wherein the input signal value corresponding to the input event comprises a specific voltage connected to the input interface type corresponding to the input event.

\* \* \* \* \*